US011251969B2

(12) United States Patent
He et al.

(10) Patent No.: US 11,251,969 B2
(45) Date of Patent: Feb. 15, 2022

(54) PERFORMING MAP ITERATIONS IN A BLOCKCHAIN-BASED SYSTEM

(71) Applicant: ALIPAY (HANGZHOU) INFORMATION TECHNOLOGY CO., LTD., Zhejiang (CN)

(72) Inventors: Jiahua He, Hangzhou (CN); Benquan Yu, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/082,756

(22) Filed: Oct. 28, 2020

(65) Prior Publication Data

US 2021/0119806 A1    Apr. 22, 2021

Related U.S. Application Data

(63) Continuation of application No. PCT/CN2019/123242, filed on Dec. 5, 2019.

(51) Int. Cl.
*H04L 9/32* (2006.01)
*H04L 9/08* (2006.01)
*H04L 9/14* (2006.01)

(52) U.S. Cl.
CPC .......... *H04L 9/3242* (2013.01); *H04L 9/0825* (2013.01); *H04L 9/14* (2013.01);
(Continued)

(58) Field of Classification Search
CPC . H04L 9/3242; H04L 9/32; H04L 9/14; H04L 9/0825; H04L 9/08; H04L 9/3247; H04L 2209/56; H04L 2209/38
See application file for complete search history.

(56) References Cited

U.S. PATENT DOCUMENTS 7,058,639 B1 *   6/2006   Chatterjee ........... G06F 16/2255
10,204,046 B1 *   2/2019   Peer ...................... H04L 9/3297
(Continued)

FOREIGN PATENT DOCUMENTS

CN    103823865    5/2014
CN    108733710    11/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Khoi V Le
(74) *Attorney, Agent, or Firm* — Fish & Richardson P.C.

(57) ABSTRACT

Disclosed herein are methods, systems, and apparatus, including computer programs encoded on computer storage media, for performing a map iteration by a network node of a blockchain network. One of the methods includes receiving a request to obtain a number of keys included in a map by the network node, the map storing a number of key-value pairs that include the number of keys and a number of values corresponding to the number of keys. The network node maintains data representing a forest that stores the number of keys that are stored in the map. The forest includes a number of trees, each tree includes up to a respective number of storage nodes, and each storage node stores a subset of the number of keys. The network node traverses the forest to retrieve the number of keys stored in the forest, and return the number of keys.

21 Claims, 6 Drawing Sheets

(52) U.S. Cl.
CPC ........ *H04L 9/3247* (2013.01); *H04L 2209/38* (2013.01); *H04L 2209/56* (2013.01)

(56) References Cited

U.S. PATENT DOCUMENTS

| | | | |
|---|---|---|---|
| 10,985,919 | B2 | 4/2021 | He et al. |
| 11,108,555 | B2 | 8/2021 | He et al. |
| 2006/0095458 | A1* | 5/2006 | Siu .................. G06F 21/10 |
| 2016/0365978 | A1 | 12/2016 | Ganesan et al. |
| 2017/0170955 | A1* | 6/2017 | Wood ................ H04L 63/1441 |
| 2018/0152442 | A1 | 5/2018 | Buldas et al. |
| 2018/0225315 | A1* | 8/2018 | Boles .................. G06F 16/2455 |
| 2019/0005079 | A1 | 1/2019 | Li |
| 2019/0018984 | A1 | 1/2019 | Setty et al. |
| 2019/0034427 | A1* | 1/2019 | Trika .................. G06F 16/21 |
| 2019/0129893 | A1 | 5/2019 | Baird, III et al. |
| 2019/0332955 | A1* | 10/2019 | Manamohan ........ H04L 9/0637 |
| 2020/0084027 | A1* | 3/2020 | Duchon ............... H04L 9/0825 |
| 2021/0234683 | A1 | 7/2021 | He et al. |

FOREIGN PATENT DOCUMENTS

| | | |
|---|---|---|
| CN | 109408551 | 3/2019 |
| CN | 110334154 | 10/2019 |
| WO | WO 2014146240 | 9/2014 |
| WO | WO 2018148149 | 8/2018 |
| WO | WO 2019072293 | 4/2019 |
| WO | WO2020098819 | 5/2020 |
| WO | WO2020098820 | 5/2020 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/123242, dated Aug. 28, 2020, 7 pages.

U.S. Appl. No. 17/084,949, filed Oct. 30, 2020, He et al.

PCT International Search Report and Written Opinion in International Application No. PCT/CN2019/123251, dated Sep. 9, 2020, 7 pages.

Broder et al., "Multilevel Adaptive Hashing," Proceedings of the Annual ACM Siam Symposium on Discrete Algorithms, Jan. 1990, pp. 43-53.

Extended European Search Report in European Application No. 19883366.7, dated Jan. 19, 2021, 9 pages.

Feldman et al., "Concurrent Multi-Level Arrays: Wait-free Extensible Hash Maps," 2013 International Conference on Embedded Computer Systems: Architectures, Modeling, and Simulation (SAMOS), Jul. 2013, pp. 155-163.

U.S. Appl. No. 17/233,056, filed Apr. 16, 2021, He et al.

* cited by examiner

US 11,251,969 B2

PERFORMING MAP ITERATIONS IN A BLOCKCHAIN-BASED SYSTEM

CROSS-REFERENCE TO RELATED APPLICATIONS

This application is a continuation of PCT Application No. PCT/CN2019/123242, filed on Dec. 5, 2019, which is hereby incorporated by reference in its entirety.

TECHNICAL FIELD

This specification relates to performing a map iteration, for example, in a blockchain-based system.

BACKGROUND

In context of computer science, a map is a data structure, which can be used to store a collection of key-value (kv) pairs and record the mapping from keys to corresponding values/data objects. Maps are provided in a variety of computer systems and can be designed to have persistent features that allow simple and transparent read and write of disk data for developers, reducing development burden. A map iteration or traversal can be performed to retrieve keys and/or values of the key-value pairs stored in the map. The map iteration typically involves accessing each of the key-value (kv) pairs stored in the map to retrieve keys and/or values sequentially. In some instances, certain applications or use cases in a blockchain system may require retrieving all keys or all values of the key-value pairs in the map, but not necessarily both. It would be desirable to develop a map iteration scheme to retrieve all the keys or values in an efficient manner.

SUMMARY

Described embodiments of the subject matter can include one or more features, along or in combination.

For example, in one embodiment, a network node of a blockchain network receives a request to obtain a number of keys included in a map. The map stores a number of key-value pairs that include the number of keys and a number of values corresponding to the number of keys. The network node maintains data representing a forest that stores the number of keys that are stored in the map. The forest includes a number of trees, and each tree include up to a respective number of storage nodes. Each storage node stores a subset of the number of keys of the map. The network node traverses the forest to retrieve the number of keys stored in the forest, and return the number of keys.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the network node traverses the forest by iterating each storage node of the forest and retrieving one or more keys that are stored in the each storage node of the forest.

In some embodiments, the network node traverses the forest by performing a depth-first search on the forest or a breadth-first search on the forest.

In some embodiment, each tree of the number of trees includes a respective number of levels, and each level include one or more storage nodes.

In some embodiments, the number of levels correspond to a number of different hash functions, and each key is stored in the forest based on one or more hash values of the key that are computed using one or more hash functions of the number of different hash functions.

In some embodiments, the network node receives a request to add a key of a key-value pair to the forest in response to the key-value pair being stored in the map. The network node determines a storage node of the forest to insert the key based on one or more hash values of the key that are computed using one or more hash functions of the number of different hash functions, and stores the key to the storage node.

In some embodiments, the network node receives a request to delete a key of a key-value pair from the forest in response to the key-value pair being deleted from the map. The network node determines a storage nodes of the forest that stores the key based on one or more hash values of the key that are computed using one or more hash functions of the number of different hash functions, and deletes the key from the storage node.

In some embodiments, the network node receives more than one request to add respective keys of key-value pairs to the forest in response to the key-value pairs being stored in the map. The network node determines different storage nodes of the forest to insert the keys based on one or more hash values of the keys that are computed using one or more hash functions of the number of different hash functions, and stores the respective keys to the different storage nodes.

In some embodiments, each tree of the number of trees includes a number of leaf storage nodes and one or more non-leaf storage nodes, and each of the one or more non-leaf storage nodes corresponds to a configurable number of child nodes.

In some embodiments, each storage node of the forest stores a configurable number of keys.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
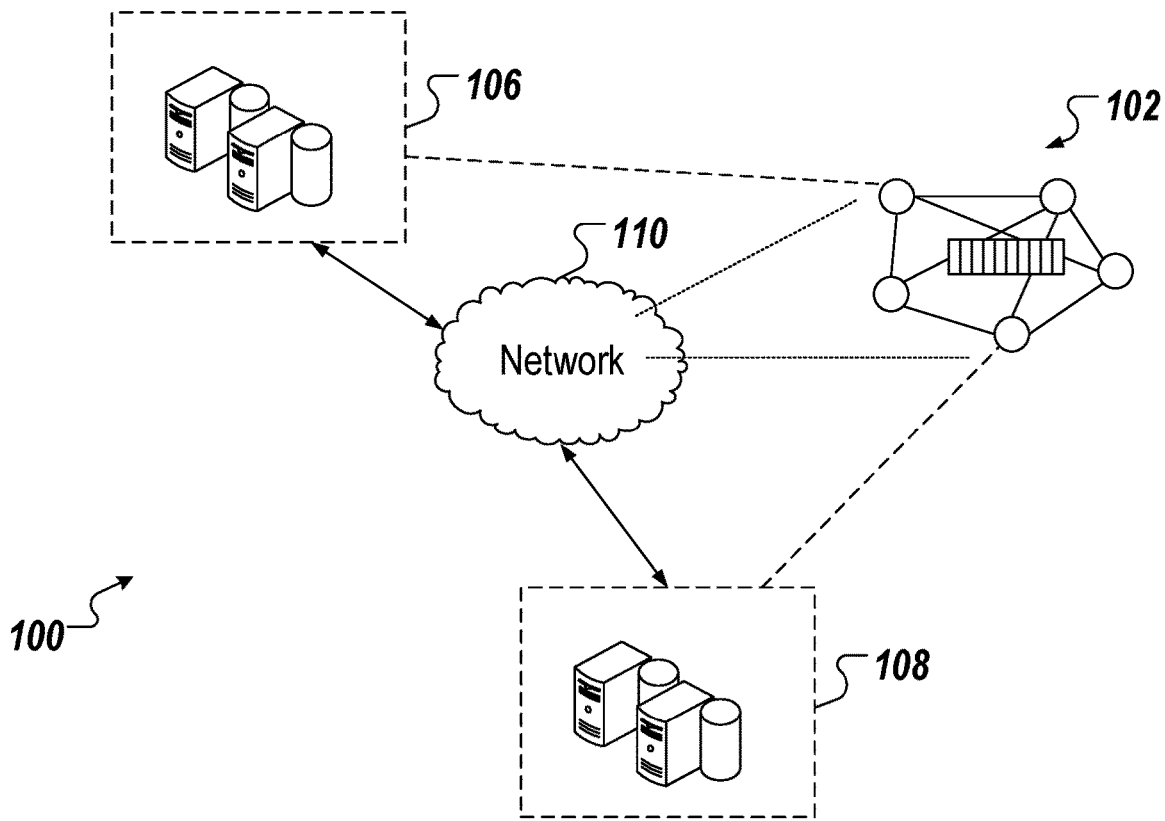
FIG. 1 is a diagram illustrating an example of an environment that can be used to execute embodiments of this specification.

This specification describes technologies for performing a map iteration to retrieve keys and/or values stored in a map. The map can be a data structure that stores a number of key-value pairs that include a number of keys and a number of values corresponding to the number of keys. In this specification, performing a map iteration can include operations that achieve a goal of the map iteration in returning keys and/or values stored in a map, without necessarily traversing the map itself. For example, technologies for performing a map iteration can include maintaining a forest data structure that stores copies of the number of keys and/or values and traversing the forest data structure, instead of the map, to retrieve the number of keys and/or values in a more efficient manner.

For conciseness, this specification describes techniques for performing a map iteration to retrieve the number of keys of the key-value pairs stored in the map. It would be understood by or apparent to a skilled artisan that the techniques can be applied to retrieve the number of values or both the number of keys and the number of values of the key-value pairs stored in the map, for example, by substituting the role of keys with the corresponding values of keys and substituting the role of keys with the corresponding key-value pairs, respectively.

The techniques described in this specification produce several technical effects. In some embodiments, separately from a map data structure (also simply referred to as a map) that store key-value pairs, a forest data structure (also simply referred to as a forest) is introduced to store all the keys of the key-value pairs that are stored in the map data structure. The forest data structure can include multiple trees that allow multiple simultaneous accesses of the forest data structure, enabling highly concurrent processing in a blockchain-based system. For example, the multiple tree configuration of the forest data structure can enable multiple simultaneous or concurrent data access or other operations on the forest in parallel on respective trees of the forest. This can avoid a bottleneck of only a single-point data access and reduce a possibility of conflicting data accesses that might otherwise occur on a single tree or other serial or sequential data structure (e.g., a queue or an array). In some embodiments, the forest data structure can use hash functions to distribute the keys in its storage nodes. The forest data structure can combine low complexity of the tree structure and a decentralized mapping function of the hash function to provide low-latency, high-concurrency map iteration requests. In some embodiments, the described map iteration scheme can significantly reduce I/O complexity of key insertion and deletion. In some embodiments, the described map iteration scheme provides configurable and customizable multi-channel concurrency, data access/retrieval speed, and other performance metrics by configuring the parameters of the forest data structure (e.g., the number of trees, the width and/or depth of each tree). Accordingly, the described map iteration scheme can be used or tailored for various applications with improved overall system performance. For example, the described map iteration scheme can be implemented in a smart contract in a blockchain-based system that provides configurable and customizable data retrieval services suitable for one or more services provided by the blockchain-based system.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a hash of the previous block. Each block also includes a local timestamp (e.g., provided by a computing device that generates the block or a computing system that manages the blockchain), its own hash, and one or more transactions. For example, the block can include a block header and a block body. The block header can include the local timestamp, its own hash, and a hash of the previous block. The block body can include payload information such as the one or more transactions (or transaction data). The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

In some embodiments, a centralized ledger system can also adopt the data structure of a blockchain to leverage immutability, reliability, and trustworthiness of data stored on a blockchain. In some embodiments, such a centralized ledger system can be referred to as a blockchain-based centralized ledger system or a universal auditable ledger service system. In some embodiments, the blockchain-based centralized ledger system can include a central trusted authority that provides transparent, immutable, and cryptographically verifiable data that are stored in blocks of a blockchain data structure. The stored data can be in a log format, including, for example, not only for transaction logs but also other transaction data and block data. Due to the existence of the central trusted authority, the blockchain-based centralized ledger system does not need to perform consensus processes to establish trust. In some embodiments, the blockchain-based centralized ledger system can be more efficient compared to a typical blockchain-based distributed or decentralized ledger system. In some embodiments, the blockchain-based centralized ledger system can provide a cloud-based storage service with enhanced trust, efficiency, and storage performance.

In some embodiments, the centralized ledger system can be a node of a blockchain network. For example, the centralized ledger system can be a non-consensus node in the blockchain network and can provide highly reliable and high-performance auditable streaming ledger services for the consensus nodes or other non-consensus nodes in the blockchain network, or entities outside of the blockchain network.

In some embodiments, the distributed ledger system (DLS) and the blockchain-based centralized ledger system can be collectively referred to a blockchain-based system. In other words, a blockchain-based system is used to refer to and is broad enough to encompass a distributed ledger system (DLS), a blockchain-based centralized ledger system, or another system that adopts the data structure of a blockchain to leverage immutability, reliability, and trustworthiness of data stored on a blockchain.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing systems include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
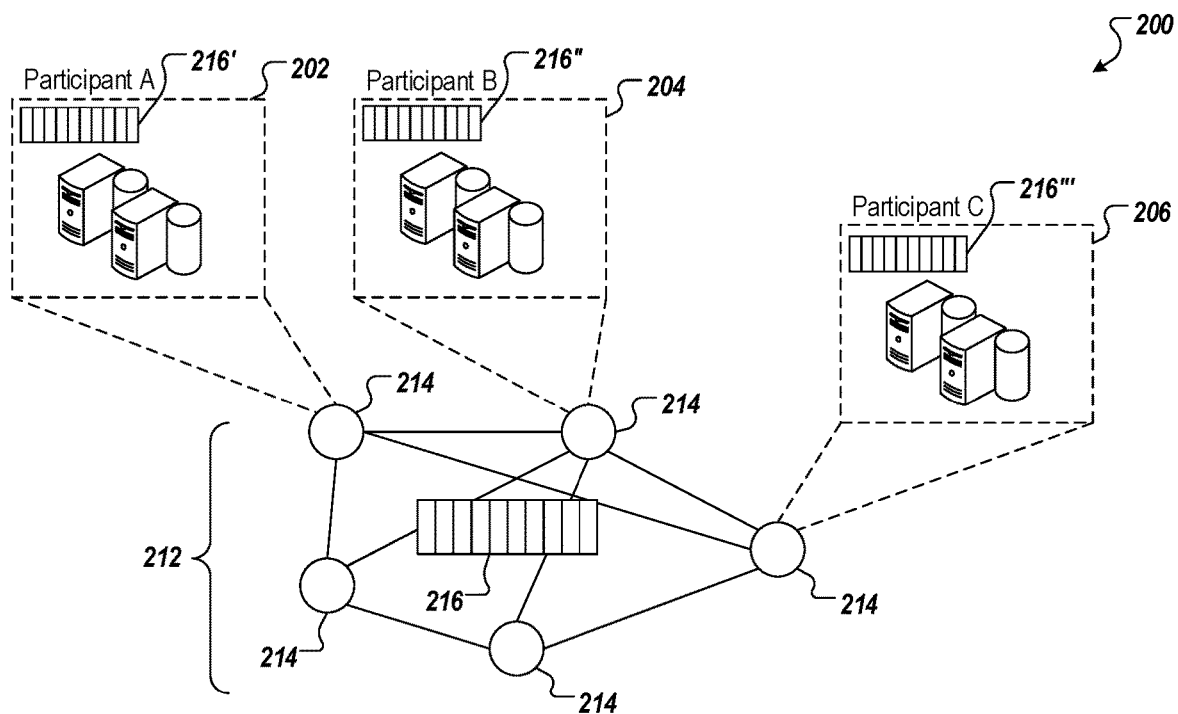
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including multiple nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. Transaction data is used as an example of data record stored in the blockchain. Examples of a transaction can include, without limitation, exchanges of something of value (e.g., assets, products, services, currency). In some embodiments, one or more operations executed in the ledger system can be stored as transaction data in the blockchain. For example, the transaction data can include one or more operations or manipulations of data stored in the block chain, information (e.g., timestamp information) obtained from an external resource, or any appropriate data can be stored in a blockchain (e.g., documents, images, videos, audio). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
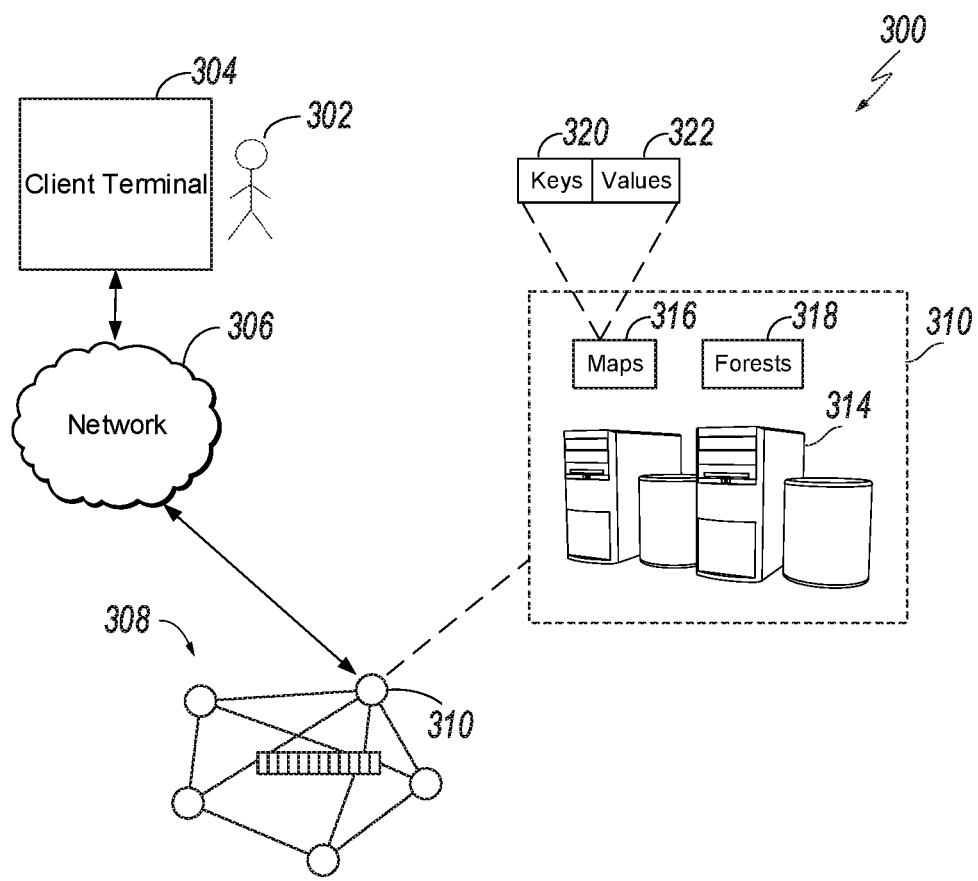
FIG. 3 is a diagram illustrating an example of a blockchain-based system for performing a map iteration in accordance with embodiments of this specification.

FIG. 3 is a diagram illustrating an example of a system 300 in accordance with embodiments of this specification. The system 300 implements a blockchain-based system for performing a map iteration. As shown, the system 300 includes a user 302, a client terminal 304, a network 306

(e.g., the Internet), and a blockchain network 308 including a number of network nodes (e.g., network node 310).

The client terminal 304 can include, for example, any suitable computer, module, server, or computing element programmed to perform methods described herein. A user 302 can access the blockchain network 308 using a client terminal 304, e.g., a mobile phone, a personal computer, or any computing device that can connect to the network 306.

In some embodiments, each network node of the blockchain network 308 can be a consensus node or a non-consensus node of a blockchain network. In some embodiments, one or more of the network nodes can be associated with a computer server that maintains different types of data. In this example, network node 310 is associated with a computer server 314 that maintains one or more maps 316 and one or more forests 318. In some embodiments, each one of the maps 316 can store a collection of key-value pairs. In some embodiments, a map 316 can include any suitable data type that can store key-values pairs, such as associative array, map, symbol table, or dictionary, etc.

In the depicted example, a map 316 can store a number of keys 320 and a number of values 322 corresponding to the keys 320. In some embodiments, a key 320 can be used as an index or an identifier to locate or retrieve the corresponding value 322. In some examples, the key 320 can represent one or more of a type, quantity, time, date, status, or another attribute of the corresponding value 322. As an example, the values 322 may include numeric values associated with assets (e.g., monetary funds, short-term and long-term investments, receivables and prepayments, inventories, deferred expenses, intangible assets, biological assets and other assets) of an enterprise, a person, or any other suitable entities, and the keys 320 can be types, quantities, times, dates, and the statuses associated with the assets, or vice versa.

In some embodiments, a user 302 can access the computer server 314 associated with the network node 310 and perform various operations on the key-value pairs in the maps 316 that are stored in the computer server 314. In some embodiments, the operations can include an addition of a key-value pair to a map 316, a removal of a key-value pair from a map 316, a modification of an existing key-value pair in a map 316, and a lookup of a value associated with a particular key in a map 316, etc.

As noted, maps (e.g., maps 316) can be used to record the mapping from keys to values/data objects. They have the advantages of simplicity, flexibility and efficiency, and can be used in compilation of blockchain smart contracts. Maps are provided in a variety of blockchain architectures. In blockchain systems, maps often have persistent features that allow simple and transparent read and write of disk data for developers, reducing development burden.

In some instances, after inserting data into the map, to retrieve a list of all keys or values stored in the map, each key-value pair in the entire map may need to be traversed, for example, using one or more built-in functions of the map. This map iteration or traversal based on the map data structure itself can be computationally intensive and time consuming.

In some embodiments, users or developers of the blockchain-based system may design their own map iteration scheme, for example, using a smart contract. For example, a linked list or array can be used to store the keys or values that are stored in the map. Each node of the linked list is used to record one or more keys, and the nodes are connected by one-way or two-way pointers.

In some embodiments, a forest data structure (e.g., forests 318) can be used to store the keys or values that are stored in the map. The forest data structure can combine the low complexity of the tree structure and the decentralized mapping function of the hash function to achieve a low-latency, high-concurrency map iteration scheme. For example, compared to the implementation of the linked lists, the map iteration scheme based on the forest can improve system throughput and execution efficiency. For example, if a single linked list is used for storing the keys or values, the insertion point of the data (e.g., the key or value) tends to be a conflict point of concurrency. When multiple smart contracts are called to perform insertion of data, only one smart contract call can succeed, resulting in a de facto serial execution. Most of the other smart contract calls will fail and rollback can occur, resulting a large amount of system resources wasted, which may seriously affect the output bandwidth of the entire system. Moreover, the map iteration scheme based on the forest can support random access, which the structure of the linked list is not suitable for. For example, when implementing deletion (or random insertion for concurrency) using the linked list, a linear iteration with an I/O complexity of O(n) may be needed for traversing a whole linked list, and the stored keys need to be compared one by one. This linear complexity may be unacceptable under normal circumstances due to disk read and write. By contrast, the I/O complexity of key insertion and deletion of the map iteration scheme based on the forest can be O(lg(n)), which significantly reduce the latency.

In some embodiments, a forest data structure can include N trees, where N is larger than 1. Each tree can include a number of storage nodes including leaf nodes and non-leaf nodes. In some embodiments, each tree can have a configurable width, W. For example, each non-leaf node of a tree can have up to W child nodes (e.g., 2 child nodes, 8 child nodes, etc.). Each storage node (including leaf nodes and non-leaf nodes) can store a subset of keys that are stored in a corresponding map. A storage node can store up to L keys, for example, 512 keys, 1024 keys, etc. In some embodiments, each tree can have a depth D. That is, each tree can include D levels, where each level can include one or more storage nodes. For example, a first level of a tree can include the root node of the tree, a second level of the tree can include the child nodes of the root node, and a third level of the tree can include respective child nodes of the child nodes in the second level, and so on. In some embodiments, one or more of the parameters, N, L, W, or D can be configurable, for example, based on system throughput, concurrency requirement, latency tolerance, or other criteria.

In some embodiments, each key stored in the map can be stored to a storage node of a tree through a series of hash functions corresponding to the multiple levels of the tree. For example, a first level of the tree can correspond to a first hash function, a second level of the tree can correspond to a second hash function which can be different from the first hash function, and so on.

In some embodiments, when a key is inserted into a forest, a first level hash function is used for determining a tree of the forest in which the key is stored. If the root node of the tree still has storage space, the key can be inserted in the root node. Otherwise, if the root node of the tree does not have available space, a second level hash function can be used to determine a storage node in the next level in which the key may be stored. The mapping can continue until a storage node with available space is found in the tree. The key can then be stored in the storage node that has available space and a counter of the storage node for keys (also referred to as a key counter) can be incremented by one.

The process of deleting keys from the forest can be similar to the insertion of keys. In some examples, the hash functions can be used to locate the corresponding tree and storage node that stores the key, and the key can then be deleted from the storage node. For example, when a key is to be deleted from a forest, a first level hash function is used for determining a tree of the forest in which that key will be deleted. If the key can be found in the root node of the determined tree, the key can be deleted from the root node. If the key is not found in the root node, a second level hash function can be used to determine a storage node in the next level in which the key may be deleted. The process can continue until the key is found in a storage node of the forest. The key counter of a storage node can be decremented by one when a key is deleted from the storage node. In some embodiments, if the key counter of a storage node of a tree is below a certain threshold (which can be configurable), the tree may be reshaped or re-constructed, for example, by moving a certain number of keys from one or more leaf nodes of the tree to the storage node in an upper level. In some embodiments, if the key counter of a storage node becomes zero, the storage node can be deleted.

Figure 4:
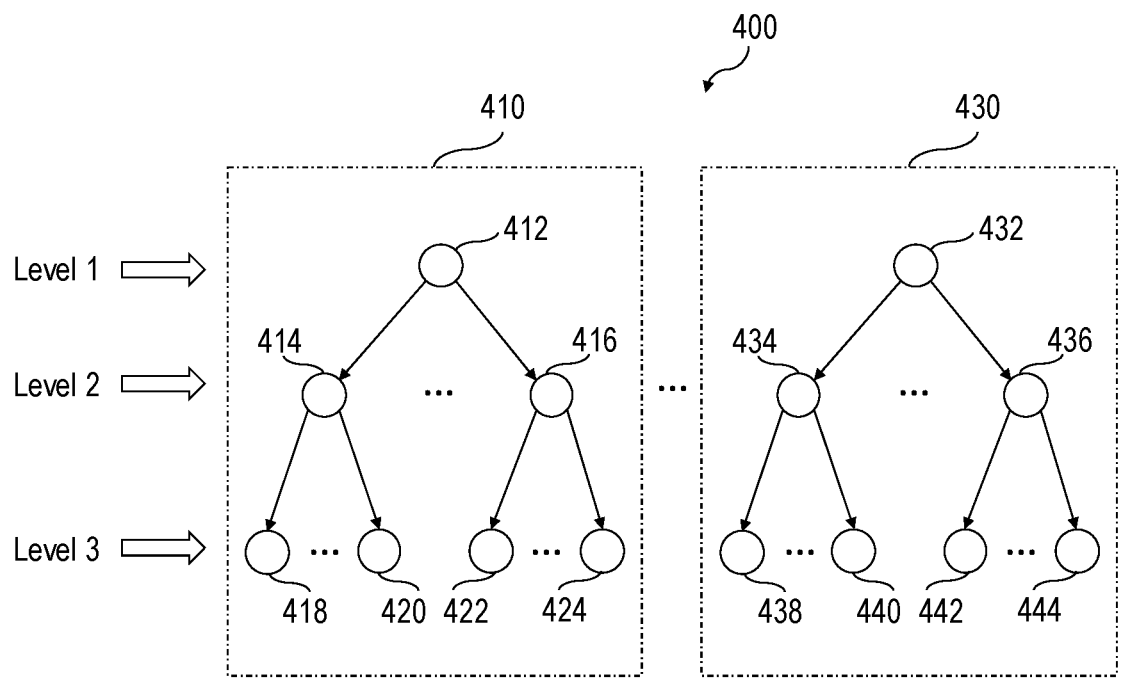
FIG. 4 is a graph illustrating an example of a forest data structure in accordance with embodiments of this specification.

FIG. 4 is a graph 400 illustrating an example of a forest data structure 400 in accordance with embodiments of this specification. The forest data structure 400 can be used to implement the forests 318 of FIG. 3. In the depicted example, the forest 400 includes trees 410 and 430. Note that the forest 400 is shown to include two trees for illustrative purposes only. The forest 400 can include any suitable number of trees, for example, based on system throughput, concurrency requirement. In some embodiments, the forest 400 can include N trees thus allowing N concurrent accesses of the forest 400.

The trees 410 and 430 each includes a root node 412 and 432 respectively. The root nodes 412 and 432 each includes two child nodes. As shown, root node 412 has child nodes 414 and 416, and root node 432 has child nodes 434 and 436. Note that the root nodes 412 and 432 are shown to include two child nodes for illustrative purposes only. The root nodes 412 and 432 can have any suitable number of child nodes. As noted, the number of child nodes, W, for a non-leaf node can be configurable, for example, based on latency tolerance and the overall storage space of the tree. For example, given the same overall storage space of the tree and the same storage space of each storage node, a smaller value of W can give rise to a lower latency in retrieving a key stored in the tree. In some embodiments, non-leaf nodes of different trees can have different numbers of child nodes. For example, the root node 412 can have a first number of child nodes, and the root node 432 can have a second number of child nodes, where the second number is different from the first number.

As shown, each one of the trees 410 and 430 includes three levels of storage nodes. The first level ("level 1") includes the root nodes (e.g., node 412 and 432). The second level ("level 2") includes child nodes of the root nodes (e.g., nodes 414, 416, 434, and 436). The third level ("level 3") includes the leaf nodes (e.g., nodes 418, 420, 422, 424, 438, 440, 442, and 444). In some embodiments, each level of storage nodes corresponds to a hash function that can be used for determining a storage location of a key in the forest. For example, a first hash function corresponding to level 1 can be used to determine which tree (e.g., tree 410 or 430) in the forest 400 that a key is stored in. In some embodiments, the storage location of a key can be determined by computing a first hash value of the key using the first hash function, computing a first modulo value by performing a first modulo operation on the first hash value (for example, with respect to the number of trees in the forest 400), and determining a tree to store the key based on the first modulo value.

Continuing with the above example, if it is determined that the root node (e.g., node 412 or 432) of the determined tree has available space, the key can then be stored in the root node of the determined tree. If it is determined that the root node of the determined tree does not have available space, a second hash function corresponding to level 2 can be used to determine a child node of the root node of the determined tree to store the key. For example, the storage location of a key can be determined by computing a second hash value of the key using a second hash function, computing a second modulo value by performing a second modulo operation on the second hash value (for example, with respect to the number of child nodes the root node of the determined tree), and determining a child node of the root node to store the key based on the second modulo value. If the determined child node at level 2 does not have available space for storing the key, the process can continue to determine a storage node in next level to store the key until a storage node that has available space is found.

In some embodiments, the hash functions that correspond to the levels of the trees can be different for different trees. For example, a hash function (e.g., hash12) that corresponds to the level 2 of the tree 410 can be different from a hash function (e.g., hash32) that corresponds to the level 2 of the tree 430. Similarly, a hash function (e.g., hash13) that corresponds to the level 3 of the tree 410 can be different from a hash function (e.g., hash33) that corresponds to the level 3 of the tree 430, that is, (e.g., hash12). In this case, given a key, its storage location can be determined in a sequential manner, level by level, by first determining which tree the key is to be stored in based on the first hash function and the first modulo operation, and then determining which storage node in the determined tree in which the key is to be stored based on the specific hash function corresponding to the level 2 of the determined tree, and possibly the specific hash function corresponding to the level 3 of the determined tree after determining which storage node in the level 2 of the determined tree in which the key is to be stored.

In some embodiments, different trees may use the same hash function for the same level. For example, each of the tree 410 and tree 430 can share the same hash function (e.g., hash2) that corresponds to the level 2 and a hash function (e.g., hash3) that corresponds to the level 3. In this case, given a key, its storage location can be determined by computing three hash values of the key based on the three hash functions at once, without the sequential processing of first identifying which tree the key is to be stored and then identifying a specific hash function corresponding to a lower level of the determined tree. For example, for a given key (e.g., k), three hash values (e.g., h1=hash1(k), h2=hash2(k), and h3=hash3(k)) can be calculated, wherein hash1 is the hash function that corresponds to the level 1 of the forest. Three respective modulo operations can be performed on the three hash values to determine a target storage node of the key. In some embodiments, a storage location can be represented as a vector of length D, where D is the depth of the forest or the total number of levels in the forest. As an example, the storage location of the key k can be represented by [modulo(h1, N), modulo(h2, W2), modulo(h3, W3)], where N is the number of trees in the forest, W2 is the width of the tree in level 2, and W3 is the width of the tree in level 3. Based on the storage location vector [modulo(h1, N), modulo(h2, W2), modulo(h3, W3)], the storage node can be identified, for example, as the (modulo(h3, W3)+1)th child node in level 3 of the (modulo(h2, W2)+1)th child node in level 2 of the (modulo(h1, N)+1)th tree.

An example of a process of deleting a key from the forest 400 can include determining a storage location (e.g., the location of a storage node of the forest 400) of the key in the forest 400 based on one or more hash functions of the forest 400, for example, according to similar techniques described above in connection with the insertion process. After identifying the storage location of the key in the forest 400 (e.g., the storage location vector), the key can be removed from the storage node of the forest 400. In some embodiments, deleting a key from the forest 400 can be performed in a sequential manner, conversely to a sequential insertion process. For example, a sequential deletion process can include locating a tree of the forest 400 that stores the key based on a first hash function corresponding to the first level of the forest 400 and determining whether the root node of the tree stores the key. If the key is found in the root node of the tree, the key can be removed from the root node. If the key is not found in the root node, a second hash function can be used to locate a child node of the root node that may store the key. This process can continue until a storage node that stores the key is found.

Using the above-described insertion process, the keys of a map can be stored in a forest and a correspondence between the map and the forest can be established. As noted, the hash-based forest data structure (e.g., forest 318, 400) as described herein can be used for traversing or iterating over a map for retrieving the keys of the map. In some embodiments, this can be done by performing a traversal or iteration process on the forest corresponding to the map. In some embodiments, the traversal or iteration process can include performing a depth-first search on the forest or performing a breadth-first search on the forest to retrieve all the keys that are stored in the forest.

In some embodiments, the described map iteration scheme allows multi-thread concurrency, which effectively improves the overall performance of the system. For example, multiple requests of insertion and/or deletion can be processed concurrently, where different trees and storage nodes of the forest can be determined to insert or delete respective keys. This can reduce concurrency conflicts and improve the overall throughput of the system.

Figure 5:
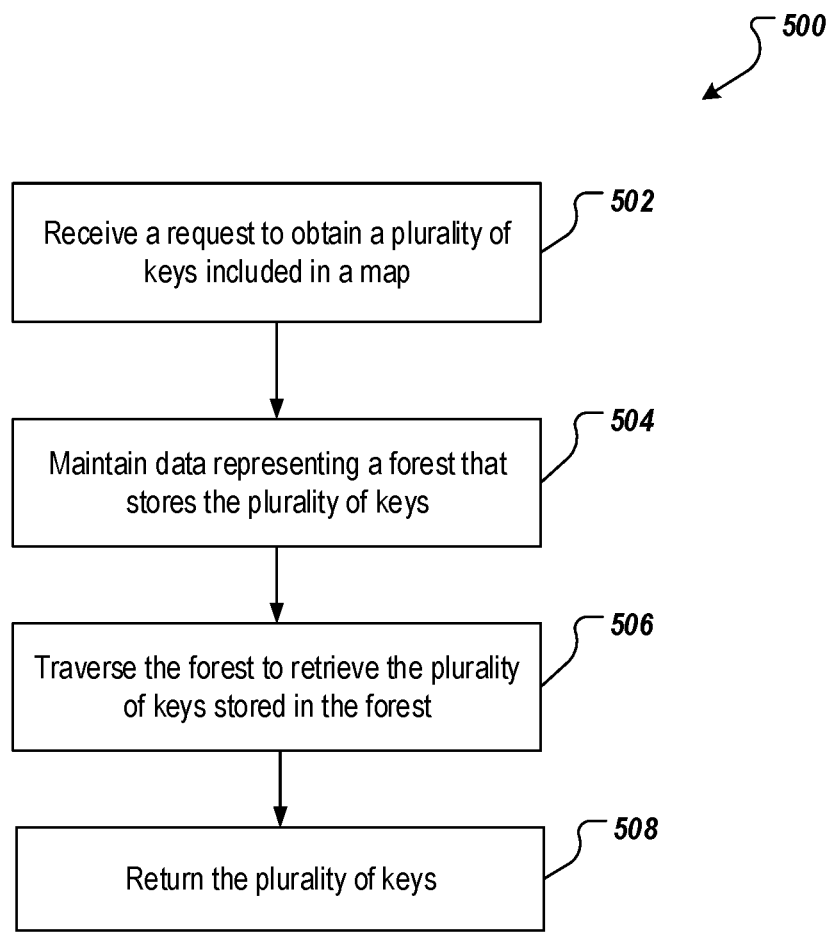
FIG. 5 is a flowchart illustrating a process of performing a map iteration that can be executed in accordance with embodiments of this specification.

FIG. 5 is a signal flow illustrating an example of a process 500 that can be executed in accordance with embodiments of this specification. The signal flow represents a process 500 for performing a map iteration. For convenience, the process will be described as being performed by a system of one or more computers, located in one or more locations, and programmed appropriately in accordance with this specification. For example, a blockchain-based system (e.g., the system 300 of FIG. 3), appropriately programmed, can perform the process. In some embodiments, the process 500 can be implemented in a smart contract in the blockchain-based system. For example, the process 500 can provide configurable and customizable data retrieval services suitable for one or more services provided by the blockchain-based system.

At 502, a network node (e.g., network node 310) of a blockchain network (e.g., blockchain network 308) receives a request to obtain a number of keys (e.g., keys 320) included in a map (e.g., map 316). In some embodiments, the map can store a number of key-value pairs that include the number of keys and a number of values (e.g., values 322) corresponding to the number of keys.

At 504, data representing a forest (e.g., forest 318 and 400) is maintained. In some embodiments, the forest stores the number of keys that are stored in the map. In some embodiments, maintaining data representing a forest includes generating a forest data structure, in addition to or separately from the map, to stores the number of keys that are stored in the map. In some embodiments, maintaining data representing a forest includes, for example, adding a new key into the forest in response to a corresponding key-value pair is stored in the map, deleting an existing key from the forest in response to a corresponding key-value pair is removed from the map, modifying an existing key in the forest in response to a corresponding key-value pair is changed in the map, or other operations on data representing the forest.

In some embodiments, the forest includes a number of trees (e.g., trees 410 and 430), where each tree includes up to a respective number of storage nodes (e.g., nodes 412-444). Each storage node can be configured to store a subset of the number of keys of the map.

In some embodiments, each tree of the forest includes a respective number of levels, where each level includes one or more storage nodes. In some embodiments, the levels of a tree correspond to a number of different hash functions. Each key in the map is stored in the forest based on one or more hash values of the key that are computed using one or more hash functions of the different hash functions.

In some embodiments, the network node can receive a request to add a key of a key-value pair to the forest in response to the key-value pair being stored in the map. The network node can determine a storage node of the forest to insert the key based on one or more hash values of the key that are computed using one or more hash functions of the plurality of different hash functions, for example, according to the techniques described with respect to FIG. 4. Then the key can be stored to the determined storage node.

In some embodiments, the network node can receive a request to delete a key of a key-value pair from the forest in response to the key-value pair being deleted from the map. The network node can determine a storage node of the forest that stores the key based on one or more hash values of the key that are computed using one or more hash functions of the plurality of different hash functions, for example, according to the techniques described with respect to FIG. 4. Then the key can be deleted from the determined from the storage node.

In some embodiments, the network node can support multiple concurrent requests to manipulate one or more keys in the map. For example, the requests can include, for example, one or more of a first request to add a first key of a first key-value pair to the forest in response to the first key-value pair being stored in the map, a second request to delete a second key of a second key-value pair from the forest in response to the second key-value pair being removed from the map, or a third request to modify a third key of a third key-value pair in the forest in response to the third key-value pair being changed in the map. The network node can determine respective storage nodes of the forest of the first key, the second key, and the third key based on one or more hash values of the respective keys that are computed using one or more hash functions of the forest. The different storage nodes of the respective keys (e.g., in different tress of the forest) allow concurrent access and operations of the forest. The respective keys can be added, deleted, or modified to the different storage nodes accordingly. As an example, the network node can receive more than one request to add respective keys of key-value pairs to the forest in response to the key-value pairs being stored in the map. The network node can determine different storage nodes of the forest to insert the keys based on one or more hash values of the keys that are computed using one or more hash functions of the plurality of different hash functions. Then the respective keys can be stored to the different storage nodes concurrently.

At 506, the forest is traversed to retrieve the number of keys stored in the forest. In some embodiments, the traversing of the forest can be performed by visiting each storage node of the forest and retrieving one or more keys that are stored in the storage node of the forest. The forest can be traversed according to any appropriate forest traversing or iteration algorithm. For example, the traversing the forest can include performing a depth-first search on the forest or performing a breadth-first search on the forest.

At 508, the number of keys that are retrieved are returned. In some embodiments, all keys that are stored in the forest can be retrieved and returned to a user that requests the map iteration.

Figure 6:
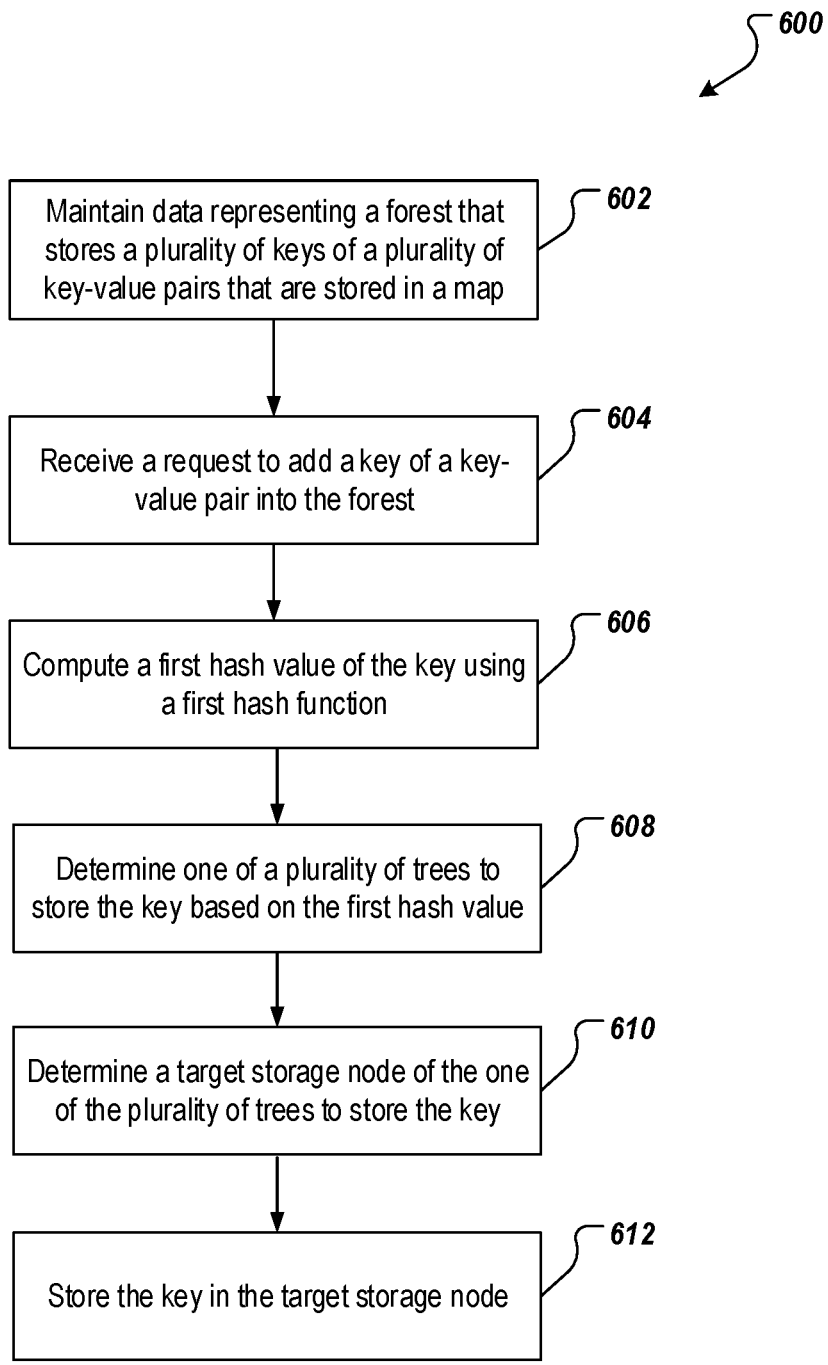
FIG. 6 is a flowchart illustrating a process of key insertion that can be executed in accordance with embodiments of this specification.

FIG. 6 is a signal flow illustrating an example of a process 600 that can be executed in accordance with embodiments of this specification. The signal flow represents a process 600 for performing a key insertion to a forest. For convenience, the process will be described as being performed by a system of one or more computers, located in one or more locations, and programmed appropriately in accordance with this specification. For example, a blockchain-based system (e.g., the system 300 of FIG. 3), appropriately programmed, can perform the process. In some embodiments, the process 600 can be implemented in a smart contract in the blockchain-based system. For example, the process 600 can provide configurable and customizable data insertion or storage services suitable for one or more services provided by the blockchain-based system.

At 602, a forest data structure (e.g., forest 318 and 400) is maintained in a network node (e.g., network node 310) of a blockchain network (e.g., blockchain network 308). In some embodiments, the forest stores a number of keys (e.g., keys 320) of a number of key-value pairs that are stored in a map (e.g., map 316). In some embodiments, the forest can include a number of trees (e.g., trees 410 and 430), where each tree can include a respective number of storage nodes. Each storage node is configured to store a subset of the number of keys of the map. In some embodiments, each of the number of trees includes a respective number of levels, and each level corresponds to a respective hash function.

At 604, the network node receives a request to add a key of a key-value pair into the forest. In some embodiments, the key-value pair is one of the key-value pairs that are stored in the map.

At 606, a first hash value of the key is computed using a first hash function. For example, for a given key (e.g., k), a first hash value of the key (e.g., h1) is computed using a first hash function (e.g., hash1). That is, h1=hash1(k). In some embodiments, the first hash function corresponds to a first level of storage nodes of the forest. In some embodiments, the first level of storage nodes of the forest include the root nodes of the trees of the forest.

At 608, one of the number of trees to store the key is determined based on the first hash value. In some embodiments, the determining of the tree to store the key can be performed by performing a modulo operation on the first hash value to generate a first modulo value and determining the one of the number of trees to store the key based on the first modulo value. In some embodiments, the modulo operation is a modulo operation relative to the number of trees in the forest (e.g., L). For example, the first modulo value (e.g., m1) can be obtained according to: m1=modulo (hash1(k), L). The first modulo value can have a value of 0, 1, 2, . . . , L−1, which can correspond to the $1^{st}$, $2^{nd}$, $3^{rd}$, . . . , or the Lth tree in the forest.

At 610, the network node determines a target storage node of the determined tree to store the key. In some embodiments, the target storage node can be determined by determining whether the root node of the determined tree has available space for storing the key. If it is determined that the root node has available space for storing the key, the root node can be determined as the target storage node and the key can be stored in the root node.

If it is determined that the root node does not have available space for storing the key, the network node can compute a second hash value of the key using a second hash function, where the second hash function corresponds to a second level of the determined tree. For example, for a second hash value of the key (e.g., h2) is computed using a second hash function (e.g., hash2). That is, h2=hash2(k). The second hash function can be different from the first hash function. Then, the network node can determine a second storage node in the second level of determined tree to store the key based on the second hash value. In some embodiments, the network node can perform a modulo operation on the second hash value to generate a second modulo value, and determines a second storage node in the second level of the determined tree to store the key based on the second modulo value. In some embodiments, the modulo operation is a modulo operation relative to the number of child nodes of the root node of the determined tree or a width of the determined tree (e.g., W). For example, the second modulo value (e.g., m2) can be obtained according to: m2=modulo (hash2(k), W). The second modulo value can have a value of 0, 1, 2, . . . , W−1, which can correspond to the $1^{st}$, $2^{nd}$, $3^{rd}$, . . . or the Wth child node of the root node of the determined tree in the forest.

In some embodiments, the network node determines whether the second storage node has available space for storing the key. If it is determined that the second storage node has available space, the second storage node can be determined as the target storage node and the key can be stored in the second storage node in the second level. If it is determined that the second storage node does not have available space, the network node can compute a third hash value of the key using a third hash function and determine the target storage node in the third level based on the third hash value. This process can continue until the target storage node is found.

At 612, the network node stores the key in the determined target storage node. In some embodiments, the key counter of the target storage node can be incremented by one when a key is inserted in the target storage node. In some embodiments, when the key counter of the target storage node reaches a predetermined threshold (e.g., 1024 keys), the target storage node can be considered full and no more keys will be inserted to the target storage node. In some embodiments, a new level (e.g., a fourth level) can be added to the forest to add new storage nodes for storing the key.

Figure 7:
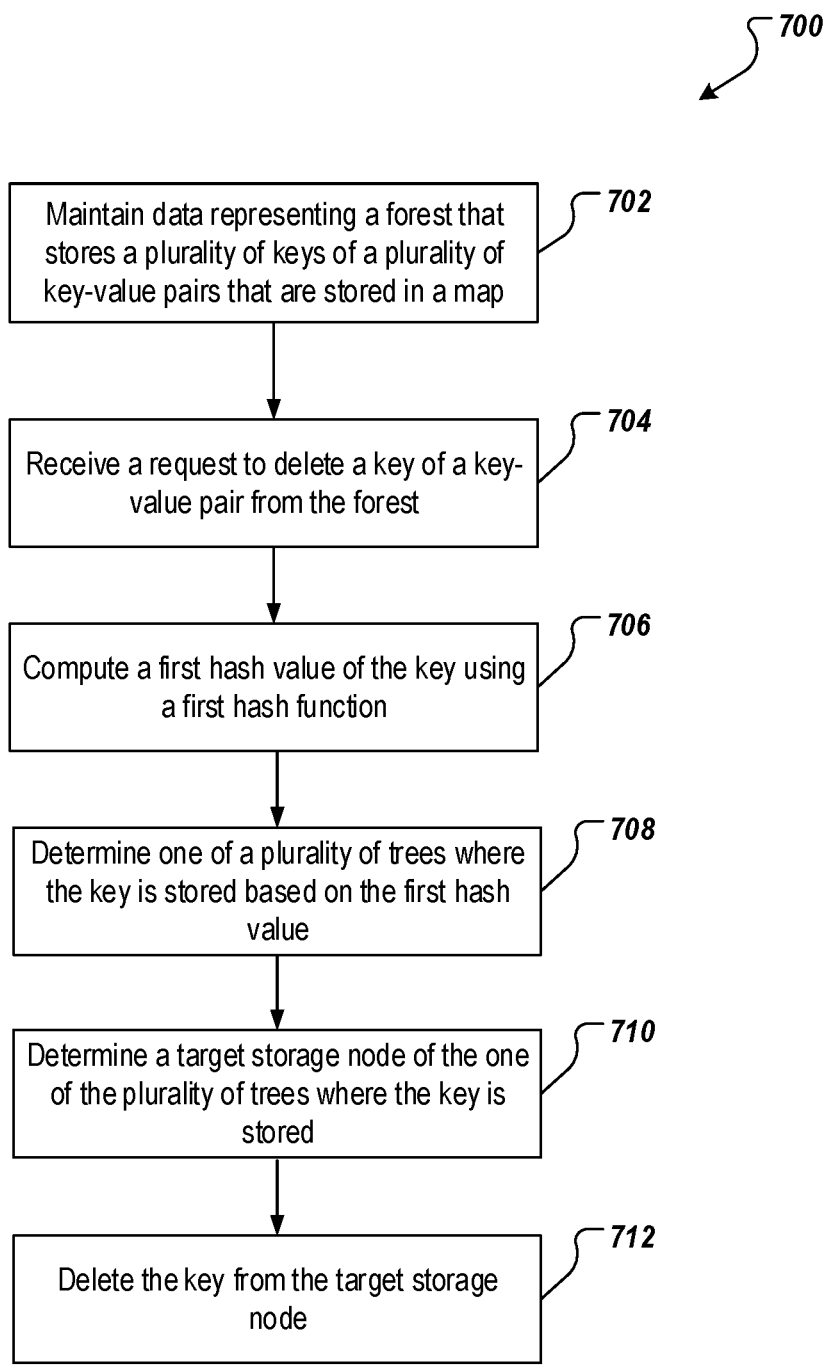
FIG. 7 is a flowchart illustrating a process of key deletion that can be executed in accordance with embodiments of this specification.

FIG. 7 is a signal flow illustrating an example of a process 700 that can be executed in accordance with embodiments of this specification. The signal flow represents a process 700 for performing a key deletion to a forest. For convenience, the process will be described as being performed by a system of one or more computers, located in one or more locations, and programmed appropriately in accordance with this specification. For example, a blockchain-based system (e.g., the system 300 of FIG. 3), appropriately programmed, can perform the process. In some embodiments, the process 700 can be implemented in a smart contract in the blockchain-based system. For example, the process 700 can provide configurable and customizable data deletion or management services suitable for one or more services provided by the blockchain-based system.

At 702, a forest data structure (e.g., forest 318 and 400) is maintained in a network node (e.g., network node 310) of a blockchain network (e.g., blockchain network 308). In some embodiments, the forest stores a number of keys (e.g., keys 320) of a number of key-value pairs that are stored in a map (e.g., map 316). In some embodiments, the forest can include a number of trees (e.g., trees 410 and 430), where each tree can include a respective number of storage nodes. Each storage node is configured to store a subset of the number of keys of the map. In some embodiments, each of the number of trees includes a respective number of levels, and each level corresponds to a respective hash function.

At 704, the network node receives a request to delete a key of a key-value pair from the forest. In some embodiments, the key-value pair is one of the key-value pairs that are stored in the map.

At 706, a first hash value of the key is computed using a first hash function. For example, for a given key (e.g., k), a first hash value of the key (e.g., h1) is computed using a first hash function (e.g., hash1). That is, h1=hash1(k). In some embodiments, the first hash function corresponds to a first level of storage nodes of the forest. In some embodiments, the first level of storage nodes of the forest include the root nodes of the trees of the forest.

At 708, one of the number of trees where the key is stored is determined based on the first hash value. In some embodiments, the determining of the tree where the key is stored can be performed by performing a modulo operation on the first hash value to generate a first modulo value and determining the one of the number of trees where the key is stored based on the first modulo value. In some embodiments, the modulo operation is a modulo operation relative to the number of trees in the forest (e.g., L). For example, the first modulo value (e.g., m1) can be obtained according to: m1=modulo (hash1(k), L). The first modulo value can have a value of 0, 1, 2, . . . , L−1, which can correspond to the $1^{st}$, $2^{nd}$, $3^{rd}$, . . . , or the Lth tree in the forest.

At 710, the network node determines a target storage node of the determined tree where the key is stored. In some embodiments, the target storage node can be determined by determining whether the key can be found in the root node of the determined tree. If it is determined that the key can be found in the root node, the root node can be determined as the target storage node and the key can be deleted from the root node.

If it is determined that the key cannot be found in the root node, the network node can compute a second hash value of the key using a second hash function, where the second hash function corresponds to a second level of the determined tree. For example, for a second hash value of the key (e.g., h2) is computed using a second hash function (e.g., hash2). That is, h2=hash2(k). In some embodiments, the second hash function can be different from the first hash function. Then, the network node can determine a second storage node in the second level of determined tree where the key may be stored based on the second hash value. In some embodiments, the network node can perform a modulo operation on the second hash value to generate a second modulo value, and determines a second storage node in the second level of the determined tree where the key may be stored based on the second modulo value. In some embodiments, the modulo operation is a modulo operation relative to the number of child nodes of the root node of the determined tree or a width of the determined tree (e.g., W). For example, the second modulo value (e.g., m2) can be obtained according to: m2=modulo (hash2(k), W). The second modulo value can have a value of 0, 1, 2, . . . , W−1, which can correspond to the $1^{st}$, $2^{nd}$, $3^{rd}$, . . . or the Wth child node of the root node of the determined tree in the forest.

In some embodiments, the network node determines whether the key can be found in the second storage node. If it is determined that the key can be found in the second storage node, the second storage node can be determined as the target storage node and the key can be deleted from the second storage node in the second level. If it is determined that key cannot be found in the second storage node, the network node can compute a third hash value of the key using a third hash function and determine the target storage node in the third level based on the third hash value. This process can continue until the key is found in the target storage node.

At 712, the network node deletes the key from the determined target storage node. In some embodiments, the key counter of the target storage node can be decremented by one when a key is deleted from the target storage node. In some embodiments, if the key counter of the target storage node is below a certain threshold (which can be configurable), the tree where the target storage node is located may be reshaped or re-constructed, for example, by moving a certain number of keys from one or more leaf nodes of the tree to the storage node in an upper level. In some embodiments, if the key counter of a target storage node becomes zero, the target storage node can be deleted.

Figure 8:
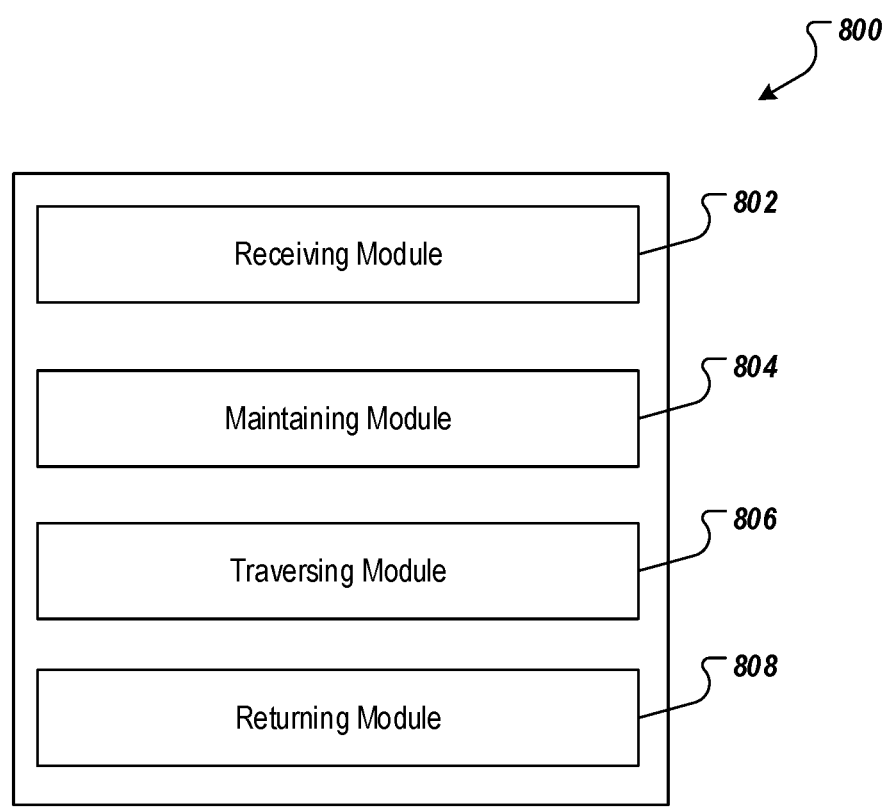
FIG. 8 is a diagram illustrating an example of modules of an apparatus in accordance with embodiments of this specification.

FIG. 8 is a diagram of an example of modules of an apparatus 800 in accordance with embodiments of this specification. The apparatus 800 can be an example of an embodiments of a blockchain node configured to perform a map iteration. The apparatus 800 can correspond to the embodiments described above, and the apparatus 800 includes the following: a receiving module 802 that receives a request to obtain a plurality of keys included in a map by a network node, the map storing a plurality of key-value pairs that include the plurality of keys and a plurality of values corresponding to the plurality of keys; a maintaining module 804 that maintains data representing a forest that stores the plurality of keys that are stored in the map, the forest including a plurality of trees, each tree including up to a respective plurality of storage nodes, each storage node storing a subset of the plurality of keys; a traversing module 806 that traverses the forest to retrieve the plurality of keys stored in the forest; and a returning module 808 that returns the plurality of keys.

In some embodiments, the apparatus 800 further includes: an iterating sub-module that iterates each storage node of the forest; and a retrieving sub-module that retrieves one or more keys that are stored in the each storage node of the forest.

In some embodiments, the traversing the forest includes at least one of the following: performing a depth-first search on the forest; or performing a breadth-first search on the forest.

In some embodiments, each tree of the plurality of trees includes a respective plurality of levels, and wherein each level includes one or more storage nodes.

In some embodiments, the plurality of levels correspond to a plurality of different hash functions, and each key is stored in the forest based on one or more hash values of the key that are computed using one or more hash functions of the plurality of different hash functions.

In some embodiments, the apparatus 800 further includes: a receiving sub-module that receives a request to add a key of a key-value pair to the forest in response to the key-value pair being stored in the map; a determining sub-module that determines a storage node of the forest to insert the key based on one or more hash values of the key that are computed using one or more hash functions of the plurality of different hash functions; and a storing sub-module that stores the key to the storage node.

In some embodiments, the apparatus 800 further includes: a receiving sub-module that receives a request to delete a key of a key-value pair from the forest in response to the key-value pair being deleted from the map; a determining sub-module the determines a storage nodes of the forest that stores the key based on one or more hash values of the key that are computed using one or more hash functions of the plurality of different hash functions; and a deleting sub-module that deletes the key from the storage node.

In some embodiments, the apparatus 800 further includes: a receiving sub-module that receives more than one request to add respective keys of key-value pairs to the forest in response to the key-value pairs being stored in the map; a determining sub-module that determines different storage nodes of the forest to insert the keys based on one or more hash values of the keys that are computed using one or more hash functions of the plurality of different hash functions; and a storing sub-module that stores the respective keys to the different storage nodes concurrently.

In some embodiments, each tree of the plurality of trees comprises a plurality of leaf storage nodes and one or more non-leaf storage nodes, and each of the one or more non-leaf storage nodes corresponds to a configurable number of child nodes.

In some embodiments, each storage node of the forest stores a configurable number of keys.

In some embodiments, the maintaining data representing a forest that stores the plurality of keys that are stored in the map comprises one or more of: generating a forest data structure to store the plurality of keys; adding a new key into the forest in response to a corresponding key-value pair is stored in the map; deleting an existing key from the forest in response to a corresponding key-value pair is removed from the map; or modifying an existing key in the forest in response to a corresponding key-value pair is changed in the map.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 8, it can be interpreted as illustrating an internal functional module and a structure of a blockchain-based map iterating apparatus. The blockchain-based map iterating apparatus can be an example of a computer server associated with a blockchain network node (e.g., computer server 314 associated with blockchain network node 310). An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method for performing a map iteration by a network node of a blockchain network, comprising:
    receiving, by a blockchain node in the blockchain network, a request to obtain a plurality of keys included in a map by the network node, the map i) being stored in the blockchain node, and ii) storing a plurality of key-value pairs that comprise blockchain transaction data generated by the blockchain network and comprise the plurality of keys and a plurality of values corresponding to the plurality of keys;
    maintaining, by the blockchain node in the blockchain network, data representing a forest that stores the plurality of keys that are stored in the map, the forest comprising a plurality of trees, each tree comprising up to a respective plurality of storage nodes, each storage node storing a subset of the plurality of keys, wherein a storage location of a key of a key-value pair on a storage node of the forest is based on one or more modulo values calculated based on one or more hash values of the key,
        wherein maintaining the data representing the forest that stores the plurality of keys that are stored in the map comprises one or more of:
            generating a forest data structure to store the plurality of keys;
            adding a new key into the forest in response to a corresponding key-value pair is stored in the map;
            deleting an existing key from the forest in response to a corresponding key-value pair is removed from the map; or
            modifying an existing key in the forest in response to a corresponding key- value pair is changed in the map;
    traversing, by the blockchain node in the blockchain network, the forest to retrieve the plurality of keys stored in the forest; and
    returning, by the blockchain node in the blockchain network, the plurality of keys.

2. The computer-implemented method of claim 1, wherein the traversing the forest to retrieve the plurality of keys stored in the forest comprises:
    iterating each storage node of the forest; and
    retrieving one or more keys that are stored in the each storage node of the forest.

3. The computer-implemented method of claim 1, wherein the traversing the forest comprises at least one of:
    performing a depth-first search on the forest; or
    performing a breadth-first search on the forest.

4. The computer-implemented method of claim 1, wherein each tree of the plurality of trees comprises a plurality of levels, and wherein each level comprises one or more storage nodes.

5. The computer-implemented method of claim 4, wherein the plurality of levels correspond to a plurality of different hash functions, and wherein each key is stored in the forest based on one or more hash values of the each key that are computed using one or more hash functions of the plurality of different hash functions.

6. The computer-implemented method of claim 5, wherein the method further comprises:
    receiving a first request to add a first key of a first key-value pair to the forest in response to the first key-value pair being stored in the map;
    determining a first storage node of the forest to insert the first key based on one or more first hash values of the first key that are computed using one or more first hash functions of the plurality of different hash functions; and
    storing the first key to the first storage node.

7. The computer-implemented method of claim 5, wherein the method further comprises:
    receiving a second request to delete a second key of a second key-value pair from the forest in response to the second key-value pair being deleted from the map;
    determining a second storage node of the forest that stores the second key based on one or more second hash values of the second key that are computed using one or more second hash functions of the plurality of different hash functions; and
    deleting the second key from the second storage node.

8. The computer-implemented method of claim 5, wherein the method further comprises:
    receiving more than one request to add respective keys of key-value pairs to the forest in response to the key-value pairs being stored in the map;
    determining different storage nodes of the forest to insert the respective keys based on one or more hash values of the respective keys that are computed using one or more hash functions of the plurality of different hash functions; and
    storing the respective keys to the different storage nodes concurrently.

9. The computer-implemented method of claim 1, wherein each tree of the plurality of trees comprises a plurality of leaf storage nodes and one or more non-leaf storage nodes, and wherein each of the one or more non-leaf storage nodes corresponds to a configurable number of child nodes.

10. The computer-implemented method of claim 1, wherein each storage node of the forest stores a configurable number of keys.

11. The computer-implemented method of claim 1, wherein the key of the key-value pair is stored on the storage node of the forest based on:

determining the one or more hash values of the key using one or more hash functions;
calculating the one or more modulo values based on a modulo operation on each of the one or more hash values of the key;
determining the storage node of the forest based on the one or more modulo values; and
storing the key into the storage node of the forest.

12. A computer-implement system for blockchain-based map iteration, comprising:
one or more processors; and
one or more computer-readable devices coupled to the one or more processors and having tangible, non-transitory, machine-readable media storing one or more instructions that, when executed by the one or more processors, perform operations comprising:
receiving a request to obtain a plurality of keys included in a map by a blockchain node in a blockchain network, the map i) being stored in the blockchain node, and ii) storing a plurality of key-value pairs that comprise blockchain transaction data generated by the blockchain network and comprise the plurality of keys and a plurality of values corresponding to the plurality of keys;
maintaining, by the blockchain node in the blockchain network, data representing a forest that stores the plurality of keys that are stored in the map, the forest comprising a plurality of trees, each tree comprising up to a respective plurality of storage nodes, each storage node storing a subset of the plurality of keys, wherein a storage location of a key of a key-value pair on a storage node of the forest is based on one or more modulo values calculated based on one or more hash values of the key,
wherein maintaining the data representing the forest that stores the plurality of keys that are stored in the map comprises one or more of:
generating a forest data structure to store the plurality of keys;
adding a new key into the forest in response to a corresponding key-value pair is stored in the map;
deleting an existing key from the forest in response to a corresponding key-value pair is removed from the map; or
modifying an existing key in the forest in response to a corresponding key-value pair is changed in the map;
traversing the forest to retrieve the plurality of keys stored in the forest; and
returning the plurality of keys.

13. The computer-implement system of claim 12, wherein the traversing the forest to retrieve the plurality of keys stored in the forest comprises:
iterating each storage node of the forest; and
retrieving one or more keys that are stored in the each storage node of the forest.

14. The computer-implement system of claim 12, wherein the traversing the forest comprises at least one of:
performing a depth-first search on the forest; or
performing a breadth-first search on the forest.

15. The computer-implement system of claim 12, wherein each tree of the plurality of trees comprises a plurality of levels, and wherein each level comprises one or more storage nodes.

16. The computer-implement system of claim 15, wherein the plurality of levels correspond to a plurality of different hash functions, and wherein each key is stored in the forest based on one or more hash values of the each key that are computed using one or more hash functions of the plurality of different hash functions.

17. The computer-implement system of claim 16, wherein the operations further comprise:
receiving a first request to add a first key of a first key-value pair to the forest in response to the first key-value pair being stored in the map;
determining a first storage node of the forest to insert the first key based on one or more first hash values of the first key that are computed using one or more first hash functions of the plurality of different hash functions; and
storing the first key to the first storage node.

18. The computer-implement system of claim 16, wherein the operations further comprise:
receiving a second request to delete a second key of a second key-value pair from the forest in response to the second key-value pair being deleted from the map;
determining a second storage node of the forest that stores the second key based on one or more second hash values of the second key that are computed using one or more second hash functions of the plurality of different hash functions; and
deleting the second key from the second storage node.

19. The computer-implement system of claim 16, wherein the operations further comprise:
receiving more than one request to add respective keys of key-value pairs to the forest in response to the key-value pairs being stored in the map;
determining different storage nodes of the forest to insert the respective keys based on one or more hash values of the respective keys that are computed using one or more hash functions of the plurality of different hash functions; and
storing the respective keys to the different storage nodes concurrently.

20. The computer-implement system of claim 12, wherein the key of the key-value pair is stored on the storage node of the forest based on:
determining the one or more hash values of the key using one or more hash functions;
calculating the one or more modulo values based on a modulo operation on each of the one or more hash values of the key;
determining the storage node of the forest based on the one or more modulo values; and
storing the key into the storage node of the forest.

21. A non-transitory, computer-readable medium storing one or more instructions executable by a computer system to perform operations comprising:
receiving a request to obtain a plurality of keys included in a map by a blockchain node in a blockchain network, the map i) being stored in the blockchain node, and ii) storing a plurality of key-value pairs that comprise blockchain transaction data generated by the blockchain network and comprise the plurality of keys and a plurality of values corresponding to the plurality of keys;
maintaining, by the blockchain node in the blockchain network, data representing a forest that stores the plurality of keys that are stored in the map, the forest comprising a plurality of trees, each tree comprising up to a respective plurality of storage nodes, each storage node storing a subset of the plurality of keys, wherein a storage location of a key of a key-value pair on a storage node of the forest is based on one or more modulo values calculated based on one or more hash values of the key, wherein maintaining the data representing the forest that stores the plurality of keys that are stored in the map comprises one or more of:

generating a forest data structure to store the plurality of keys;

adding a new key into the forest in response to a corresponding key-value pair is stored in the map;

deleting an existing key from the forest in response to a corresponding key-value pair is removed from the map; or modifying an existing key in the forest in response to a corresponding key-value pair is changed in the map;

traversing the forest to retrieve the plurality of keys stored in the forest; and returning the plurality of keys.

* * * * *